Sept. 5, 1961  L. I. KAPLAN ET AL  2,999,146
FLUID-PERVIOUS SHEET MATERIAL
Filed Dec. 4, 1957  2 Sheets-Sheet 1
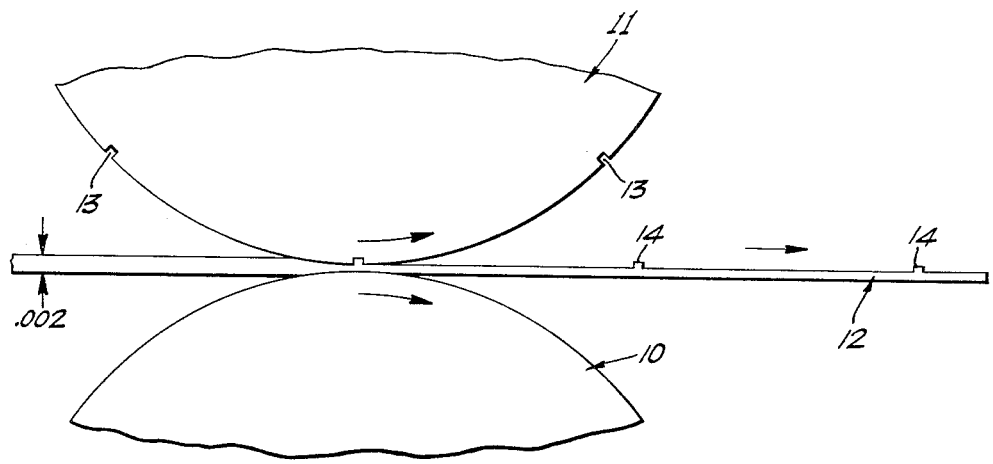
FIG. 1.
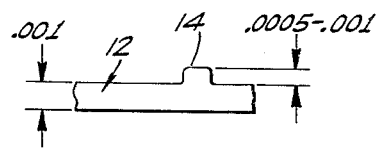
FIG. 2.
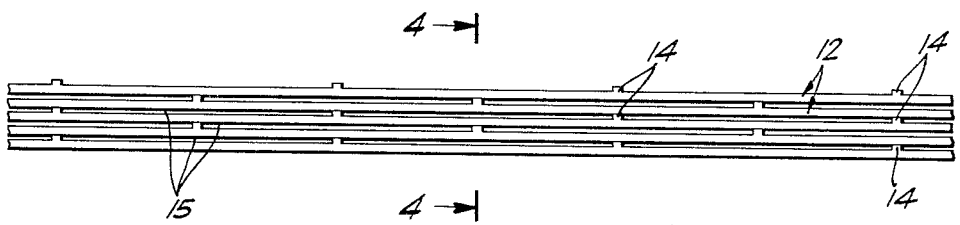
FIG. 3.
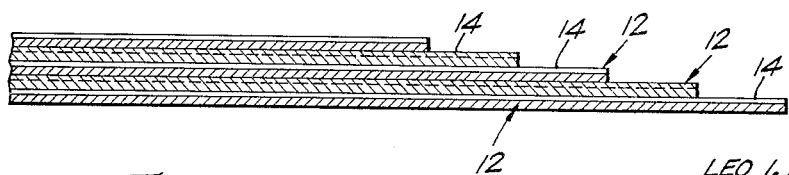
FIG. 4.
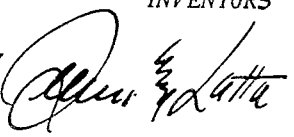
LEO I. KAPLAN
LEO HORRES
INVENTORS
BY
ATTORNEYS Sept. 5, 1961         L. I. KAPLAN ET AL         2,999,146
FLUID-PERVIOUS SHEET MATERIAL Filed Dec. 4, 1957         2 Sheets-Sheet 2

LEO I. KAPLAN
LEO HORRES
INVENTORS

BY
ATTORNEYS

2,999,146
// FLUID-PERVIOUS SHEET MATERIAL
// Leo I. Kaplan and Leo Horres, Sunland, Calif., assignors to Poly Industries, Inc., a corporation of California
// Filed Dec. 4, 1957, Ser. No. 700,667
// 5 Claims. (Cl. 219—93)

The present invention relates to fluid-pervious material and more particularly to a laminated structure made from a plurality of sheets of material rolled in a manner to provide parallel ribs effective in providing wide low-height fluid passages therebetween when the sheets are laminated together by way of the spacer ribs.

During recent years, much effort has been expended to provide suitable fluid-pervious material adapted for use as a boundary layer energizing covering on aerodynamically-contoured structures. Such a surface covering must be thin, flexible and replete with a multiplicity of extremely fine openings through which fluid may be delivered preferably along a flow path substantially coincident with the plane of the exterior surface, the fluid so bled through the covering medium being effective in known manner to energize beneficially the slip stream air flowing over the covering material. Accordingly, the present invention is closely related to the laminated material disclosed in an application filed by Leo I. Kaplan for United States Letters Patent, Serial No. 646,252, filed March 15, 1957, entitled Fluid Dynamic Structure, now Patent No. 2,959,377 dated Nov. 8, 1960. The corresponding surface covering there provided was formed by corrugating strips of thin metal to provide spacer ribs crosswise of the component strips.

According to the present invention, a laminated surface covering is provided in which the strips of sheet material are suitably processed as with grooved rollers to form upstanding ribs projecting from the body of a sheet of substantially uniform thickness thereby avoiding weakening the sheet at the spacer ribs. Furthermore, the sheet material provided according to the present invention is free of reverse bends tending to create internal stresses localized at the reverse bends and likely to lead to flexure or failure of the sheet at such places. Another difference representing a decided advantage of the present structure over that of the earlier application is the provision of ribs having accurately contoured dimensions including flat surfaces through which much stronger and more effective bonds can be formed with the contacting surfaces of adjacent sheets.

Accordingly, it is a primary object of the present invention to provide an improved laminated fluid-pervious covering material particularly adapted for use as a covering on aerodynamically-contoured surfaces.

Another object of the invention is the provision of an improved method of fabricating a laminated fluid-pervious high-strength surface covering for aerodynamically-contoured surfaces and wherein individual laminae are arranged in echelon.

Another object of the invention is the provision of a method of rolling thin sheet stock to form parallel ribs of accurately dimensioned low-heights suitable for holding superimposed strips uniformly spaced in a manner providing fluid passages open along the opposite lateral edges of the laminate.

Another object of the invention is the provision of a fluid-pervious laminate structure formed of superimposed identical strips of material, each strip being of uniform thickness except opposite its integral ribs and wherein these ribs are adapted to be fuse bonded to a flat surface area of another similar sheet of the material.

These and other more specific objects will appear upon reading the following specification and claims and upon considering in connection therewith the attached drawings to which they relate.

Referring now to the drawings in which preferred embodiments of the invention are illustrated:

FIGURE 1 is a fragmentary end view of a pair of rollers designed to process the sheet material used in making the laminated covering material;

FIGURE 2 is a greatly magnified fragmentary view along the edge of the rolled sheet material used in making the laminated covering;

FIGURE 3 is a side elevational view along one edge of laminate formed by superimposing a plurality of the strips formed by the rollers shown in FIGURE 1;

FIGURE 4 is a fragmentary transverse sectional view taken on line 4—4 of FIGURE 3 showing the manner of offsetting the laminae in echelon;

Figure 5:
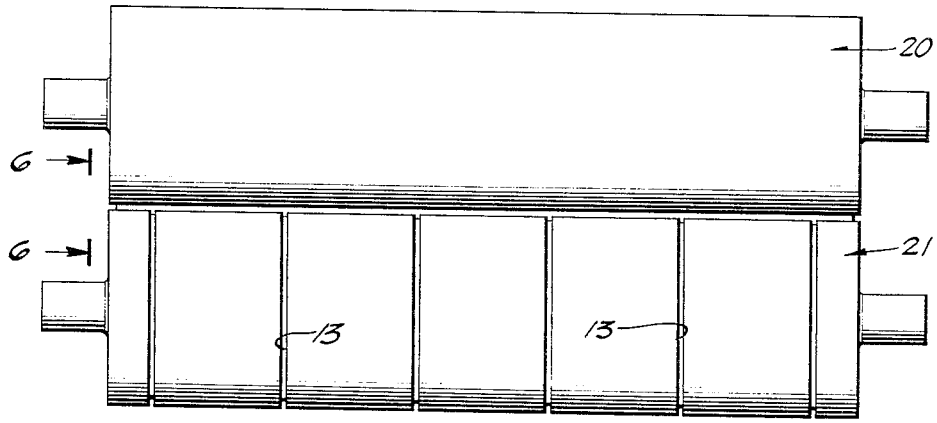
FIGURE 5 is a side elevational view of an alternate roller construction useful in forming the sheet material used in making the laminated fluid-pervious covering.

Referring first to FIGURES 1 to 4, there is shown a pair of rollers 10 and 11 suitably supported from trunnions, not shown, and adapted to be pressed together against the opposite sides of a sheet of malleable metal 12 under the required metal-working pressures. As here shown, lower roller 10 is smooth-surfaced while the upper roller 11 has circumferentially spaced grooves 13 extending axially thereof for a distance greater than the breadth of the sheet material 12 to be processed. The rolls are arranged to be rotated simultaneously in opposite directions to advance the sheet material as indicated by the arrow and co-act with one another to roll sheet 12 to an accurately predetermined thickness of 1 to 2 mils and to provide the same on at least one surface with parallel ribs 14 having a suitable height and preferably one somewhat less than the thickness of the material. If the finished thickness of sheet 12 is one mil then the projection height of ribs 14 is preferably from one-half to one mil. The ribs are substantially of rectangular shape in cross-section although the opposite corners may be slightly rounded as indicated in FIGURE 2. However, the major portion of the top edges are substantially flat through a width corresponding generally to the thickness of the sheet itself, or 1 mil. The rib height is one-half to one mil although it will be appreciated that this height may and preferably is increased if the thickness of the sheet itself is increased, it being understood that the dimensional values given above by way of illustrative example are not to be construed as limiting except as required by the principles of the present invention.

Due to the thinning action and the metal working performed on the sheet made to provide a sheet of uniform thickness as well as one having the described ribs, the unprocessed sheet entering between rollers 10 and 11 preferably is appreciably thicker than the desired finished product and may have an unprocessed thickness as great as double that of the finished product. The width of the sheet being processed may vary according to the application being made although in the usual case the strip is relatively narrow to the end that the sheets may be superimposed in echelon to provide a finished laminated structure up to 100 mils or more in thickness.

The continuous metal stripping processed as described issues from rollers 10 and 11 and may be coiled, or cut to length preparatory to being arranged in superimposed relation and in echelon as indicated in FIGURE 4. According to a preferred method of assembling the laminate, the adjacent ribs 14 of adjacent sheets are arranged in staggered relation in the manner illustrated in FIGURE 3 with the lateral edges of the strips offset to the extent suggested in FIGURE 4. While so held in this manner, the assembled sheets are passed between conventional type welding electrodes such as the well-known roller type of electrodes, each pair being located in vertical alignment opposite an intervening row of ribs 14. As welding current is passed between the electrodes, a suitable welding pressure is applied to the opposite faces of the assembly, the flow of welding current being continued until the contacting surfaces of the ribs and of the adjacent sheets fuse together to provide a strong bond. It will be understood that a similar pair of roller type welding electrodes is arranged opposite each row of aligned ribs 14, thereby permitting a long strip of the laminate structure to be welded together simultaneously.

While the strong joint provided by electric welding is preferred, other types of rigidly fused joints may be formed. Reference is had, for example, to braze fusing which may be performed by passing rollers coated with brazing compound along the upper surfaces of each of ribs 14 prior to the assembly of the laminae strips together as described above for the purpose of coating the edge of the ribs with the compound. This assembly is then rigidly clamped together and placed in a brazing oven until the contacting surfaces fuse together. Thereafter, the assembly is allowed to cool following which the clamping rigging is removed. In still another mode of fuse bonding, metal to metal adhesives of which several suitable ones are commercially available, are applied to the edges of ribs 14 in the same manner described in connection with the brazing compound. The assembly is then clamped together as before and may be placed in an oven to hasten curing and setting of the adhesive material. In practicing either of the last described methods, care must be exercised to avoid applying excessive brazing compound or adhesive due to the extremely narrow passages desired to be left between adjacent ribs 14. Under controlled conditions, no problem arises.

Figure 6:
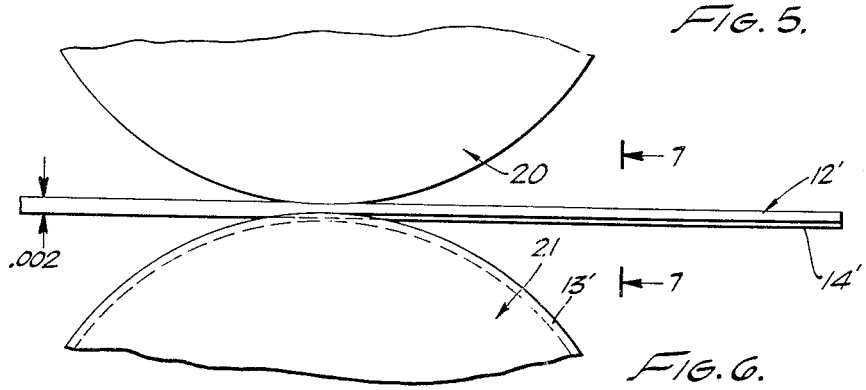
FIGURE 6 is an enlarged fragmentary view taken along line 6—6 on FIGURE 5.
Figure 7:
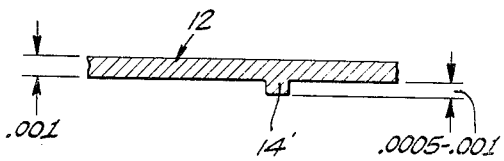
FIGURE 7 is an enlarged fragmentary sectional view taken along line 7—7 on FIGURE 6.

Referring to FIGURES 5 and 6, there is shown a second type of roller suitable for making the ribbed sheet material described above and wherein the ribs differ in being rolled lengthwise of the sheet instead of transversely as shown in FIGURE 1. Thus, the smooth surfaced upper roller 20 cooperates with the annularly grooved roller 21 in rolling sheets of material 12' having parallel widely spaced ribs 14' projecting downwardly from its under side. Ribs 14' are formed by grooves 13' encircling roller 21 at uniformly spaced intervals. The dimensions of the finished product are preferably those indicated in FIGURE 7 although it will be understood that these dimensions may differ widely from the stated values depending upon the number of plys being used to make a given laminate, the amount of overlap, the strength of the sheet material employed and the structure to which the covering material is to be applied.

The continuous stripping provided by rollers 20 and 21 may be of any width and may be severed into strips of a desired width without cutting transversely of the low-height ribs 14'. For this reason, sheets rolled in the manner shown in FIGURES 5 and 6 may be subdivided more conveniently than is the case with respect to the material formed as shown in FIGURES 1 and 2, since subdividing the latter material necessitates severing the same crosswise of ribs 14. So severing the ribs may lead to deformation of the material and the partial closing of the outlet from the small-dimensioned air passages 15 formed between adjacent strips 12.

Laminated fluid-pervious covering material is formed from superimposed strips 12' in the same manner described above in connection with the first described embodiment. However, in FIGURE 8 there is shown a slightly different arrangement in which the low-height ribs 14' are aligned with one another rather than in staggered relation as shown in FIGURE 3. This arrangement has certain advantages in that the finished laminate is somewhat more flexible than that shown in FIGURE 3 but there is greater likelihood that the strips 12' will be pressed together in immediate adjacent rows of ribs 14'. This danger can be safeguarded against by the closer spacing of ribs 14'. Furthermore, the rows of fluid passages 15' directly overlie one another rather than being staggered as they are in the FIGURE 3.

Figure 8:
FIGURE 8 is a view similar to FIGURE 3 showing an alternate method of assembling the laminated structure.

In either the FIGURE 3 or the FIGURE 8 constructions the outlet ends of the fluid passages deliver ribbon-like streams of fluid parallel to the surface of strips 12 and 12' thereby providing a thin energizing layer of fluid which merges with the slip-stream fluid stream flowing over the exterior of the entire covering in a manner well understood by those familiar with boundary layer energizing phenomena. In this connection, it will be understood that the thin flexible laminate structure provided as herein described is suitable for application over aerodynamically-contoured surfaces of aircraft, guided missiles, bombs, fire missiles and the like surfaces to improve the flight characteristics thereof while greatly increasing the heat-insulating qualities, the strength and other characteristics of the structure to which applied. In view of the extremely thin nature of the individual laminae and the interconnection of the same at spaced intervals, it will be readily understood that the resulting laminate has great strength coupled with flexibility and resistance to crushing. Preferably the sheets 12 are formed from any suitable metal such as stainless steel, aluminum, brass and the like so processed that they can be rolled to the required shape with facility and accuracy.

While the particular fluid-pervious laminated covering material for aerodynamically-contoured structures herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. That improvement in the method of manufacturing a boundary layer energizing material for use as a covering for aerodynamically-contoured surfaces which comprises rolling thin metal sheet material to provide low parallel ridges upstanding from the surface thereof a distance of approximately 1 to 2 mils in sheet material having a finished thickness after rolling of 1 to 2 mils, superimposing said sheets upon one another in echelon so as to leave an exposed strip along the outer lateral edge of said sheets, and securely bonding said strips together opposite said ribs to provide a fluid-pervious covering material suitable for application to aerodynamically-contoured surfaces.

2. That improvement defined in claim 1 characterized in that said bonding step is performed by passing said superimposed sheets of metal between welding electrodes under pressure as welding current is passed between said electrodes in paths including said parallel ribs until the latter become fused to a non-ribbed surface area of the adjacent metal sheet.

3. That improvement defined in claim 2 characterized in that the ribs of adjacent sheets are arranged substantially in alignment with one another.

4. That improvement defined in claim 2 characterized in that the ribs of adjacent sheets are offset laterally from one another.

5. That improvement defined in claim 2 characterized in that the ribs of adjacent sheets are offset laterally from one another in such manner that all rows of ribs are substantially uniformly spaced apart.

(References on following page)

References Cited in the file of this patent

UNITED STATES PATENTS

| | | | |
|---|---|---|---|
| 928,701 | Rietzel | July 20, 1909 |
| 1,094,910 | Lackman | Apr. 28, 1914 |
| 1,132,676 | Murray et al. | Mar. 23, 1915 |
| 1,622,664 | Murray et al. | Mar. 29, 1927 |
| 1,819,272 | Short | Aug. 18, 1931 |
| 2,340,860 | Bragg | Feb. 8, 1944 |
| 2,445,801 | Partiot | July 27, 1948 |
| 2,746,139 | Van Pappelendam | May 22, 1956 |
| 2,752,672 | Tolman | July 3, 1956 |